May 9, 1939.    D. I. ASHWORTH    2,157,882
PROCESS FOR PURIFYING VEGETABLE AND ANIMAL OILS
Filed Aug. 4, 1937
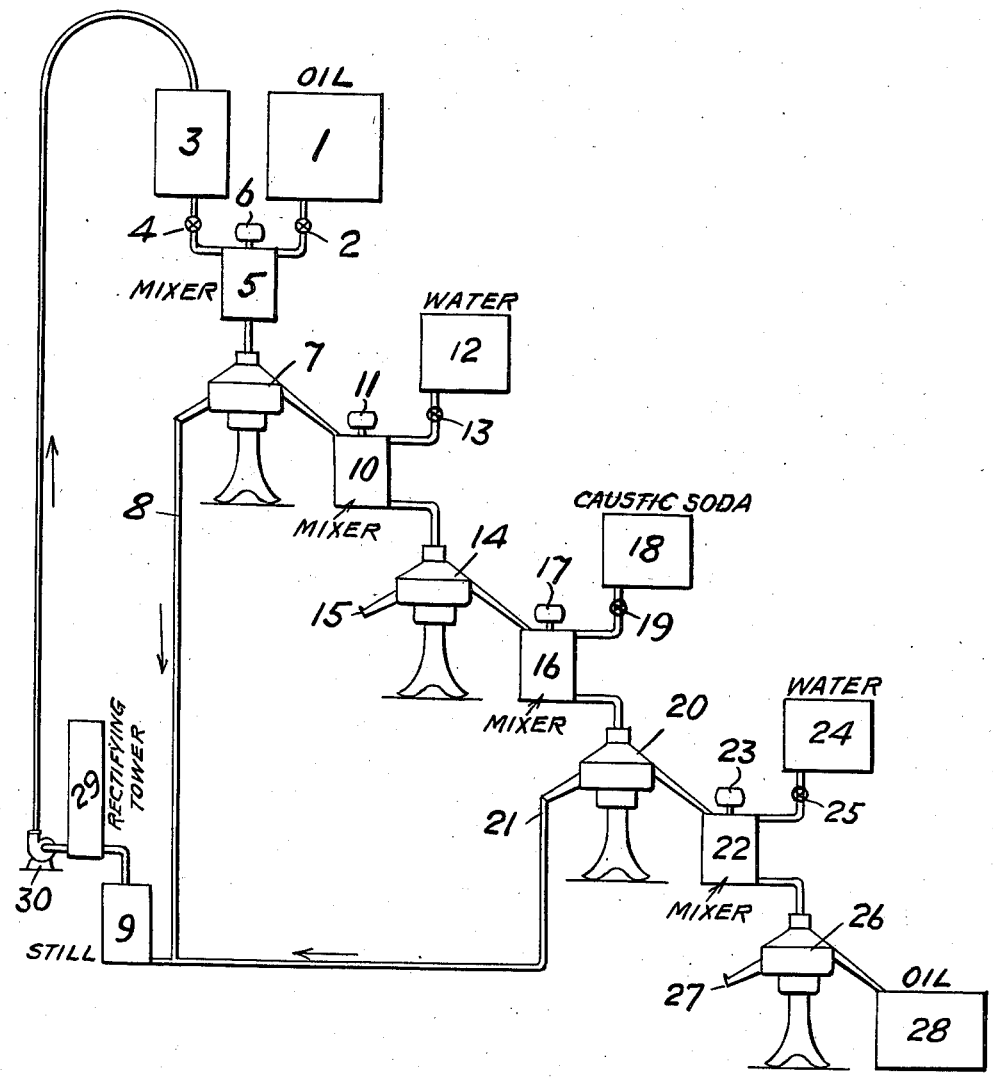
WITNESS:
Rob R Kitchel
INVENTOR
Daniel Irving Ashworth
BY
Busser and Harding
ATTORNEYS.

Patented May 9, 1939

2,157,882

UNITED STATES PATENT OFFICE 2,157,882

PROCESS FOR PURIFYING VEGETABLE AND ANIMAL OILS

Daniel Irving Ashworth, Wappingers Falls, N. Y., assignor to The De Laval Separator Company, New York, N. Y., a corporation of New Jersey Application August 4, 1937, Serial No. 157,242

5 Claims. (Cl. 260—425)

My invention is an improvement in processes for refining of natural organic products such as vegetables, fish and animal oils.

The object of my invention is the provision of an improved process for removal of free fatty acids (F. F. A.) which, if left in the oil, cause rapid deterioration, and of the strong yellow and red coloring matters which are objected to by users, and to effect this removal without substantial saponification of the neutral oil.

I know that it is old to neutralize acids with caustic soda which, when used in excess, will also combine with some of the coloring matters and remove them, but when caustic is used in such an excess that it will reduce the color to the desired extent it combines with and saponifies some of the neutral oil and so increases the refining loss.

I also know that it is old to, instead of neutralizing with caustic soda, treat oil with an alkylolamine, preferably though not necessarily, monoethanolamine, thereby removing most of the acids and some of the coloring matter. However, the oil thus treated has a cloudy appearance and is liable to deteriorate on standing.

I have found that if, after treating with an alkylolamine, preferably monoethanolamine, and removal of a major portion of the soaps formed, I wash with water and remove the water and impurities that associate themselves with it, then treat with a weak alkaline solution and remove the soaps formed and follow this with a final water wash, I can produce a very pure and stable oil.

While every batch of oil will require a different treatment, I describe the following treatment of cottonseed oil by way of illustration.

Raw cottonseed oil, containing coloring matter and the other impurities ordinarily found therein as well as about 8% of free fatty acids, is treated at about 40° C. with about one-third its volume of monoethanolamine. This somewhat elevated temperature is chosen for two reasons; it hastens the reaction and also the subsidence separation of the resultants into two phases. After separation of the two phases I preferably mix with the oil about 10% of its volume of water and separate the water and associated impurities from the oil. I then treat the oil with about 2% of a 16° Bé. solution of caustic soda and separate the solution and associated impurities from the oil. As a final step I mix about 20% of water with the oil and separate the water and associated residual impurities therefrom.

While, for best results, I prefer to use the four above described steps, a modicum of the results may be attained by practicing the first, third and fourth steps, that is, treat with monoethanolamine and separate, treat with caustic and separate, and finally wash with water and separate.

In the accompanying drawing, which shows a flow diagram of an apparatus for practicing my improved process: 1 is a tank for raw oil and has an outlet controlled by a valve 2. 3 is a tank for the reagent and has an outlet controlled by a valve 4. 5 is a mixer driven by a motor 6. 7 is a centrifugal separator having, for the heavy constituent, an outlet 8 leading to a still 9 and a light constituent outlet leading to a mixer 10 driven by a motor 11. 12 is a water tank having an outlet, controlled by a valve 13, leading to the mixer 10. 14 is a centrifugal separator having a heavy constituent outlet 15 and a light constituent outlet leading to a mixer 16 driven by a motor 17. 18 is a reagent tank having an outlet, controlled by a valve 19, leading to the mixer 16. 20 is a centrifugal separator having a heavy constituent outlet 21, leading also to the still 9, and a light constituent outlet leading to a mixer 22 driven by a motor 23. 24 is a water tank having an outlet, controlled by a valve 25, leading to the mixer 22. 26 is a final centrifugal separator having a heavy constituent outlet 27 and a light constituent outlet leading to a storage tank 28. 29 is a rectifying column and 30 a pump.

In operation, oil and reagent pass from tanks 1 and 3 at rates controlled by valves 2 and 4 to the mixer 5 where they are agitated for the time required for the reaction between the reagent and the impurities in the oil. The mixture of oil and reaction products, namely soaps, then flows to the separator 7. Here a major portion of the reaction products and any uncombined reagent are separated from the oil and flow to the still 9, while the partially purified oil flows to the mixer 10, where it meets and is mixed with water, under control of the valve 13, from tank 12.

After thorough mixing the water-oil mixture flows to the second centrifuge 14, where the water and associated impurities are separated and discharged through the spout 15, while the further purified oil flows to the mixer 16, where it meets a stream of dilute alkaline solution, under control of the valve 19 from tank 18.

After proper mixing to change the alkylolamine soaps to soda soaps, the treated oil flows to the centrifugal separator 20, where the alkaline solution and combined and associated impurities are separated from the oil and flow through the pipe 21 to the still 9, while the still further purified oil flows to the mixer 22, where it meets a stream of water, under control of valve 25, from tank 24.

After proper mixing the water-oil mixture flows to the centrifugal separator 26, where the water and the associated final impurities are separated and discharged from the spout 27, while the thoroughly purified oil flows to the storage tank 28.

In the still 9 a high vacuum is maintained while superheated steam at about 120° C. is passed through the liquid. In a rectifying column 29 of the usual type substantially pure alkylolamine is separated from the water and is returned by pump 30 to tank 3 for repeated use. The water may be allowed to go to waste or (its purity making it of value for re-use) it may be returned to tank 24.

The preferable temperature, percentages of water addition and the amount and strength of the caustic soda solution will vary with different oils and with different percentages of impurities, coloring matter and fatty acids contained therein. Thus, in treating cottonseed oil, the temperature may vary between 20° and 50° C. and will depend largely upon the extent to which it is desired to expedite the reaction and the subsidence separation. The percentage of water added may vary from 0 to 20 per cent. in the first water treatment and from 10 to 30 per cent. in the second water treatment, although it is advantageous to use a substantially larger percentage of water in the second water treatment than in the first. If a 16° Bé. solution of caustic soda be used, the percentage thereof may vary from one to five per cent., although this percentage should be increased or decreased with decrease or increase in the strength of the solution. In treating other vegetable oils and in treating the various fish and other animal oils, the factors of temperature, percentage and strength of alkaline solution may be varied within a somewhat wider range. All the alkylolamines are efficient in greater or less degree. Any dilute alkaline solution, such as caustic potash, sodium or potassium carbonate, or other alkalies may be substituted for a caustic soda solution, which, however, is distinctly preferable by reason of its efficiency and cheapness. The amount of caustic soda or other alkali that is added should be slightly in excess of the theoretical quantity required to combine with any of the alkylolamines left in the oil, plus that which is required to combine with the amine soaps and the free fatty acids left in the oil in order to convert them to sodium soaps.

What I claim and desire to protect by Letters Patent is:

1. The process of removing free fatty acids from vegetable and animal oils and improving the color, which includes mixing with the oil an alkylolamine, separating from the oil the major portion of the reaction products thereby formed together with any uncombined alkylolamine, mixing with the thus partly purified oil a dilute solution of caustic alkali, and separating from the oil the reaction products together with any remaining reagent, thereby producing a refined oil without cloudy appearance and substantially free of acids and which will not substantially deteriorate on standing.

2. The process of removing free fatty acids from vegetable and animal oils and improving the color, which includes mixing with the oil an alkylolamine, separating from the oil the major portion of soaps formed and any free alkylolamine, mixing with the thus partly purified oil a dilute caustic soda solution to thereby change the residual alkylolamine soaps to soda soaps, and separating from the oil the soda soaps together with any remaining uncombined alkylolamine.

3. The process of removing free fatty acids from vegetable and animal oils and improving the color, which includes mixing with the oil an alkylolamine, separating from the oil the major portion of the reaction products thereby formed, together with any uncombined alkylolamine, mixing with the thus partly purified oil a dilute solution of caustic alkali, separating from the oil the reaction products and solution, washing the further purified oil with water, and separating the water and associated impurities from the oil.

4. The process of removing free fatty acids from vegetable and animal oils and improving the color, which includes mixing with the oil an alkylolamine, separating from the oil the major portion of the reaction products thereby formed together with any uncombined alkylolamine, washing the thus partly purified oil with water, separating the water and associated impurities from the oil, mixing with the oil a dilute solution of caustic alkali, and separating from the oil the reaction products and solution.

5. The process of removing free fatty acids from vegetable and animal oils and improving the color, which includes mixing with the oil an alkylolamine, separating from the oil the major portion of the reaction products thereby formed together with any uncombined alkylolamine, washing the thus partly purified oil with water, separating the water and associated impurities from the oil, mixing with the oil a dilute solution of caustic alkali, separating from the oil the reaction products and solution, washing the further purified oil with water, and separating the water and associated impurities from the oil.

DANIEL IRVING ASHWORTH.